(12) United States Patent
Yang et al.

(10) Patent No.: US 12,266,169 B2
(45) Date of Patent: Apr. 1, 2025

(54) AUTOMATED CHANGE ASSESSMENT OF TARGET OBJECTS DURING A DYNAMIC ISR MISSION

(71) Applicant: The Boeing Company, Chicago, IL (US)

(72) Inventors: Yan Yang, Brisbane (AU); Paul Foster, Brisbane (AU)

(73) Assignee: The Boeing Company, Chicago, IL (US)

( * ) Notice: Subject to any disclaimer, the term of this patent is extended or adjusted under 35 U.S.C. 154(b) by 329 days.

(21) Appl. No.: 17/810,948

(22) Filed: Jul. 6, 2022

(65) Prior Publication Data
US 2024/0013532 A1  Jan. 11, 2024

(51) Int. Cl.
*G06V 20/17* (2022.01)
*B64C 39/02* (2023.01)
(Continued)

(52) U.S. Cl.
CPC ............ *G06V 20/17* (2022.01); *B64C 39/024* (2013.01); *G06V 10/22* (2022.01); *G06V 10/757* (2022.01);
(Continued)

(58) Field of Classification Search
CPC ...... G06V 20/17; G06V 10/22; G06V 10/757; G06V 2201/07; G06V 10/46; G06V 10/25;
(Continued)

(56) References Cited

U.S. PATENT DOCUMENTS

| 9,389,084 | B1 * | 7/2016 | Chen ...................... G01C 11/06 |
| 10,922,578 | B2 * | 2/2021 | Banerjee ............... G06T 7/0002 |

(Continued)

FOREIGN PATENT DOCUMENTS

CN   109255317 B   6/2021

OTHER PUBLICATIONS

Asokan Anju et al: "Change detection techniques for remote sensing applications: a survey", Earth Science Informatics, Springer Berlin Heidelberg, Berlin/Heidelberg, vol. 12, No. 2, Mar. 8, 2019 (Mar. 8, 2019), pp. 143-160, XP036783908, ISSN: 1865-0473, DOI: 10.1007/S12145-019-00380-5 [retrieved on Mar. 8, 2019].

(Continued)

*Primary Examiner* — Henok Shiferaw
*Assistant Examiner* — Woo C Rhim
(74) *Attorney, Agent, or Firm* — Yee & Associates, P.C.

(57) ABSTRACT

Automated real-time aerial change assessment of targets is provided. An aerial image of a target area is recorded during a flyover and a target detected in the aerial image. A sequence of images of the target area are recorded during a subsequent flyover. The system determines a target detection probability according to confidence scores of the sequence of images and determines a change status of the target. Responsive to a target change, a percentage of change is determined according to image feature matching between first aerial image and each of the images from the second flyover. Target detection probability and percentage of change are combined as statistically independent events to determine a probability of change. The probability of change and percentage of change for each image in the sequence is output in real-time, and final change assessment is output when the aircraft exits the target area.

20 Claims, 8 Drawing Sheets

(51) Int. Cl.
*G06V 10/22* (2022.01)
*G06V 10/75* (2022.01)
*B64U 101/30* (2023.01)

(52) U.S. Cl.
CPC ...... *B64U 2101/30* (2023.01); *G06V 2201/07* (2022.01)

(58) Field of Classification Search
CPC ...... G06V 10/84; G06V 20/13; G06V 20/176; G06V 20/52; G06V 20/10; G06V 10/764; G06V 20/58; G06V 20/56; G06V 10/751; G06V 10/44; G06V 20/41; G06V 10/462; B64C 39/024; B64U 2101/30; B64U 10/13; B64U 2101/00; B64U 2101/31; B64U 10/00; G06T 2207/10032; G06T 7/70; G06T 2207/10016; G06T 2207/30232; G06T 7/74; G06T 7/11; G06T 2207/30181; G06T 7/13

See application file for complete search history.

(56) References Cited

U.S. PATENT DOCUMENTS

| | | | | |
|---|---|---|---|---|
| 11,238,282 | B2* | 2/2022 | Ng | G06N 3/088 |
| 11,928,813 | B2* | 3/2024 | Shin | G06T 7/73 |
| 2008/0298638 | A1* | 12/2008 | Miyazaki | G06V 20/39 382/106 |
| 2009/0067725 | A1* | 3/2009 | Sasakawa | G01C 11/28 382/190 |
| 2010/0092036 | A1* | 4/2010 | Das | G06V 10/255 382/165 |
| 2010/0100835 | A1* | 4/2010 | Klaric | G06V 30/422 715/810 |
| 2014/0064554 | A1* | 3/2014 | Coulter | G06T 7/254 382/294 |
| 2017/0021923 | A1* | 1/2017 | Fisher | B64U 70/97 |
| 2017/0061217 | A1* | 3/2017 | Cha | G06F 18/2415 |
| 2018/0046188 | A1* | 2/2018 | Hwang | G06T 7/248 |
| 2019/0344886 | A1* | 11/2019 | Agrawal | G08G 5/0021 |
| 2019/0354741 | A1* | 11/2019 | Yang | G06V 20/17 |
| 2019/0369648 | A1* | 12/2019 | Fang | G05D 1/106 |
| 2019/0392211 | A1* | 12/2019 | Hartman | G06T 7/174 |
| 2020/0104719 | A1* | 4/2020 | Wiltshire | G06V 10/82 |
| 2020/0320293 | A1* | 10/2020 | Yang | G06F 18/214 |
| 2020/0334901 | A1* | 10/2020 | Upendran | G06T 15/04 |
| 2021/0397546 | A1* | 12/2021 | Cser | G06V 10/82 |
| 2022/0245936 | A1* | 8/2022 | Valk | G06V 20/13 |
| 2023/0196600 | A1* | 6/2023 | Portail | G06T 7/20 382/286 |
| 2023/0215185 | A1* | 7/2023 | Song | G06V 10/25 382/103 |

OTHER PUBLICATIONS

Cai Liping et al: "Object-oriented change detection method based on adaptive multi-method combination for remote-sensing images", International Journal of Remote Sensing, vol. 37, No. 22,Nov. 16, 2016 (Nov. 16, 2016), pp. 5457-5471, XP093088064, GB ISSN: 0143-1161, DOI: 10.1080/01431161.2016.1232871.

European Patent Office Extended Search Report, dated Oct. 20, 2023, regarding Application No. EP23170999.9, 10 pages.

Radke R J et al: "Image Change Detection Algorithms: A Systematic Survey", IEEE Transactions on Image Processing, IEEE, USA, vol. 14, No. 3, Mar. 1, 2005 (Mar. 1, 2005), pp. 294-307, XP002602265, ISSN: 1057-7149, DOI: 10.1109/TIP.2004.838698.

"Methodology for Combat Assessment," CJCSI 3162.02, Mar. 8, 2019, Joint Staff, Washington, D.C., 20318, 102 pages.

Shi et al., "Change Detection Based on Artificial Intelligence: State-of-the-Art and Challenges," Remote Sensing 2020, 12, 1688, 35 pages.

Miller et al., "Objects Based Change Detection in a Pair of Gray-Level Images," Pattern Recognition 38.11, 2005, 33 pages.

Shi et al., "Object-Based Change Detection using Georeferenced UAV Images," International Archives of the Photogrammetry, Remote Sensing and Spatial Information Sciences, vol. 38.1/C22, Zurich, Switzerland, 2011, 5 pages.

Saur et al., "Change Detection in UAV Video Mosaics Combining a Feature Based Approach and Extended Image Differencing," The International Archives of the Photogrammetry, Remote Sensing and Spatial Information Sciences, vol. XLI-B7, Prague, Czech Republic, Jul. 12-19, 2016, 6 pages.

De Jong et al., "Unsupervised Change Detection in Satellite Images Using Convolutional Neural Networks," 2019 International Joint Conference on Neural Networks (IJCNN), Budapest, Hungary, Jul. 2019, 8 pages. https://arxiv.org/abs/1812.05815.

Fujita et al., "Damage Detection from Aerial Images via Convolutional Neural Networks," 15th IAPR International Conference on Machine Vision Applications (MVA), Nagoya University, Nagoya, Japan, May 8-12, 2017, 4 pages.

Garcia Rubio et al., "Automatic Change Detection System over Unmanned Aerial Vehicle Video Sequences Based on Convolutional Neural Networks," Sensors 2019, 19, 4484, 16 pages.

Maeda et al., "Road Damage Detection and Classification Using Deep Neural Networks with Smartphone Images," Computer-Aided Civil and Infrastructure Engineering 33.12, 2018, 15 pages.

Ale et al., "Road Damage Detection Using RetinaNet," 2018 IEEE International Conference on Big Data (Big Data), Seattle, Washington, Dec. 2018, 4 pages.

Li et al., "Automatic pixel-level multiple damage detection of concrete structure using fully convolutional network," Computer-Aided Civil and Infrastructure Engineering 34.7, 2019, 19 pages.

\* cited by examiner

AUTOMATED CHANGE ASSESSMENT OF TARGET OBJECTS DURING A DYNAMIC ISR MISSION

BACKGROUND INFORMATION

1. Field

The present disclosure relates generally to autonomous change detection, and more specifically to real-time aerial change assessment onboard an aircraft without the need for orthorectification of images.

2. Background

An autonomous ISR (intelligence, surveillance, reconnaissance) mission often requires a reliable situation assessment of a target object of interest. The assessment may be related to monitoring of, e.g., construction processes, seasonal and periodic assessment of changes to assets and structures at remote locations requiring onsite maintenance, as well as damage assessment from storms and other natural disasters.

Therefore, it would be desirable to have a method and apparatus that take into account at least some of the issues discussed above, as well as other possible issues. For example, it would be desirable to have a method and apparatus that overcome a technical problem with scheduling aircraft maintenance.

SUMMARY

An illustrative embodiment provides a computer-implemented method for automated change assessment of target objects. The method comprises recording an aerial image of a target area during a first flyover and detecting a target object in the aerial image with a corresponding confidence score above a detection threshold. A sequence of aerial images of the target area are recorded during a subsequent second flyover. The system determines in real-time a probability of detection of the target object according to respective confidence scores of the sequence of aerial images. The system determines in real-time a status of change of the target object according to the confidence scores of the sequence of aerial images. Responsive to a determination the target object has changed, the system determines in real-time a percentage of change according to image feature matching distance between an area of interest in the aerial image from the first flyover and each image of the sequence of aerial images from the second flyover. The probability of detection of the target object and the percentage of change are combined as statistically independent events to determine a probability of change. The probability of change and percentage of change for each image in the sequence of images is output in real-time, and a final change assessment is output when the aircraft exits the geographic bounds of the target area.

Another illustrative embodiment provides a computer-implemented method for real-time automated change assessment by a flight computer onboard an unmanned aerial vehicle. The method comprises recording, with an onboard flight camera, an aerial image of a target area during a first flyover and detecting a target object in the aerial image with a corresponding confidence score above a detection threshold. The onboard flight camera records a sequence of aerial images of the target area during a subsequent second flyover. The system determines in real-time a probability of detection of the target object according to respective confidence scores of the sequence of aerial images. The system determines in real-time a status of change of the target object according to the confidence scores of the sequence of aerial images. Responsive to a determination the target object has changed, the system determines in real-time a percentage of change according to image feature matching distance between an area of interest in the aerial image from the first flyover and each image of the sequence of aerial images from the second flyover. The probability of detection of the target object and the percentage of change are combined as statistically independent events to determine a probability of change. The probability of change and percentage of change for each image in the sequence of images is output in real-time, and a final change assessment is output when the aircraft exits the geographic bounds of the target area.

Another illustrative embodiment provides a system for automated change assessment of target objects. The system comprises a storage device configured to store program instructions and one or more processors operably connected to the storage device and configured to execute the program instructions to cause the system to: record an aerial image of a target area during a first flyover; detect a target object in the aerial image with a corresponding confidence score above a detection threshold; record a sequence of aerial images of the target area during a subsequent second flyover; determine in real-time a probability of detection of the target object according to respective confidence scores of the sequence of aerial images; determine in real-time a status of change of the target object according to the confidence scores of the sequence of aerial images; responsive to a determination the target object has changed, determine in real-time a percentage of change according to image feature matching distance between an area of interest in the aerial image from the first flyover and each image of the sequence of aerial images from the second flyover; combine the probability of detection of the target object and the percentage of change as statistically independent events to determine a probability of change; and output in real-time the probability of change and percentage of change for each image in the sequence of images; and output a final change assessment when the aircraft exists the geographic bounds of the target area.

Another illustrative embodiment provides a computer program product for automated change assessment of target objects. The computer program product comprises a computer-readable storage medium having program instructions embodied thereon to perform the steps of: recording an aerial image of a target area during a first flyover; detecting a target object in the aerial image with a corresponding confidence score above a detection threshold; recording a sequence of aerial images of the target area during a subsequent second flyover; determining in real-time a probability of detection of the target object according to respective confidence scores of the sequence of aerial images; determining in real-time a status of change of the target object according to the confidence scores of the sequence of aerial images; responsive to a determination the target object has changed, determining in real-time a percentage of change according to image feature matching distance between an area of interest in the aerial image from the first flyover and each image of the sequence of aerial images from the second flyover; combining the probability of detection of the target object and the percentage of change as statistically independent events to determine a probability of change; outputting in real-time the probability of change and percentage of change for each image in the sequence of images; and outputting the final change assessment when the aircraft exists the geographic bounds of the target area.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
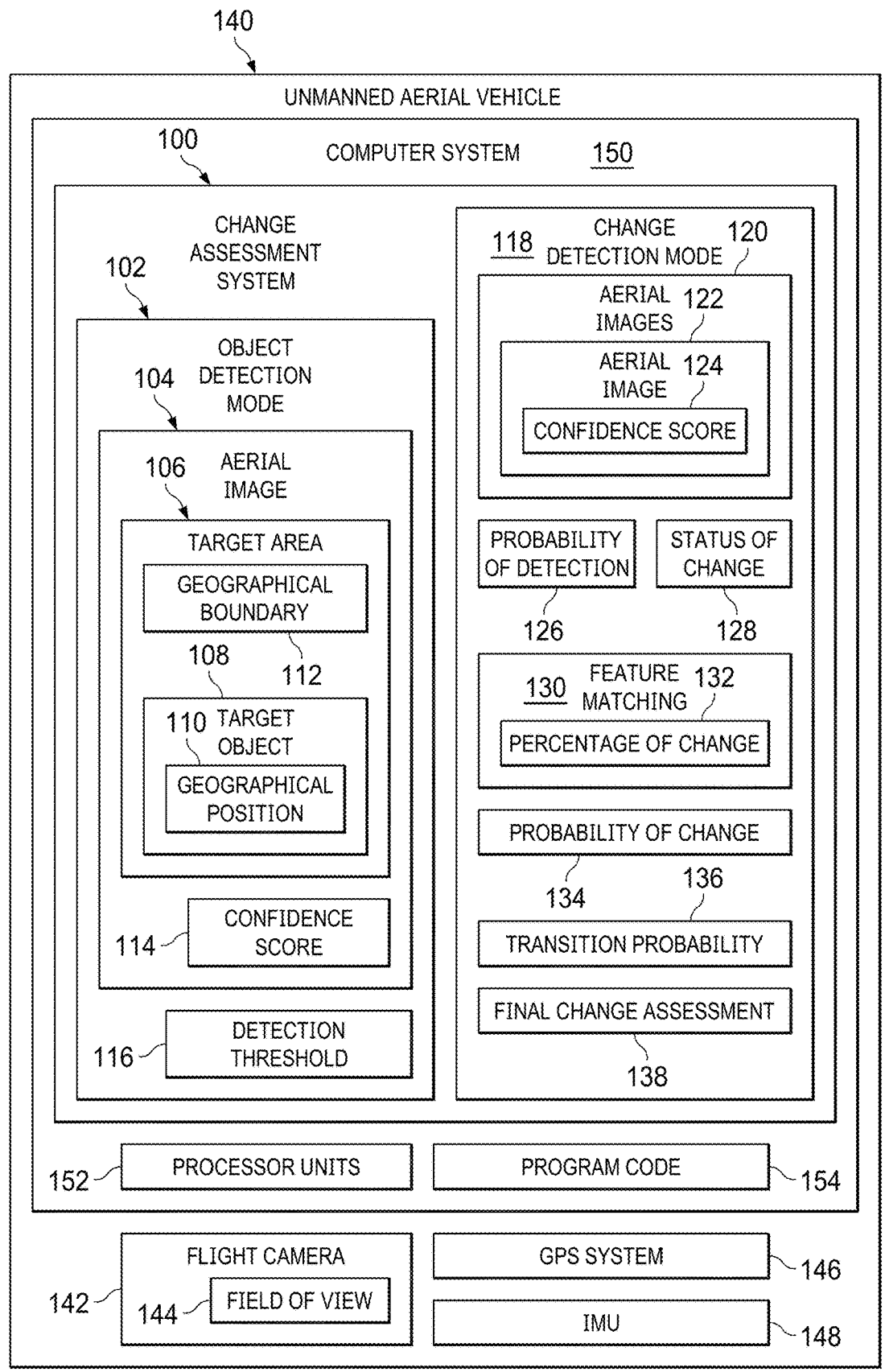
FIG. 1 depicts an illustration of a block diagram of a change assessment system in accordance with an illustrative embodiment.

The illustrative embodiments recognize and take into account one or more different considerations as described herein. For example, the illustrative embodiments recognize and take into account that many existing approaches to provide autonomous change assessments rely on orthorectified satellite images. The majority of change detection algorithms use a pair of images representing before and after states of a target object. The techniques in this category require images to be aligned prior to change detection using image registration and geographical rectification techniques.

The illustrative embodiments recognize and take into account that performing a reliable change assessment on an unmanned aerial vehicle (UAV) in real-time during flight is a very difficult problem. The difficulty is due to the dynamic flight profile in a natural environment resulting in a wide variety of input conditions impacting the flight camera and high degrees of variations in the viewing angle, lighting conditions, image quality, etc.

The illustrative embodiments recognize and take into account that change assessment must be calculated rapidly on a resource constrained UAV platform, while existing orthorectified approaches are too slow and too resource intensive to run on a UAV.

The illustrative embodiments provide a method to automatically detect, register, and assess change to a target object (or objects) during dynamic ISR flight by an unmanned aerial vehicle. The illustrative embodiments run during autonomous flights, processing an inflight camera feed and position inputs in real-time.

The illustrative embodiments use a probability model that utilizes the outputs of object detection and image feature matching subsystems. The change probability is propagated through time using the image sequence captured by the flight camera. The updated and final assessment is output as a percentage of change (0-100%), and the category of change/damage (e.g., low, moderate, severe) if appropriate.

As used herein, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

As used herein, "a number of" when used with reference to items, means one or more items. For example, "a number of different types of networks" is one or more different types of networks. In illustrative example, a "set of" as used with reference items means one or more items. For example, a set of metrics is one or more of the metrics.

With reference now to FIG. 1, an illustration a block diagram of a change assessment system is depicted in accordance with an illustrative embodiment. Change assessment system 100 may be implemented in a computer system 150 on board an unmanned aerial vehicle (UAV) 140 equipped with a flight camera 142 with field of view 144.

Change assessment system 100 operates in object detection mode 102 or change detection mode 118. Object detection mode 102 is used to locate and identify a target object of interest during an initial flyover. Change detection mode 118 is then employed during a subsequent flyover to analyze the object for any changes from the previous flyover.

During object detection mode 102, change assessment system 100 records an aerial image 104 with a flight camera 142 on UAV 140. Aerial image 104 encompasses a target area 106 containing a target object 108 of interest. Target object 108 is detected with a corresponding confidence score 114. Detection is accepted when the confidence score 114 exceeds a specified detection threshold 116.

Target object 108 has an associated geographical position 110 which may be determined via geographical positioning system (GPS) coordinates, which may be provided by onboard GPS system 146 and/or inertial measurement unit (IMU) 148. Change assessment system 100 may use the geographical position 110 in conjunction with the field of view 144 of the flight camera 142 to determine a geographical boundary 112 of the target area 106. The geographic boundary 112 of the target area 106 is used to ensure the target geographical position 110 is within the corner pixels of image frames during a subsequent flyover.

After the target object 108 is detected during the initial flyover, change assessment system 100 switches over to change detection mode 118 when the UAV 140 receives a command message to start change detection during a subsequent second flyover.

Upon entering the target area 106 change assessment system 100 records a sequence of aerial images 120. Each aerial image 122 has a respective corresponding confidence score 124 as to whether the target object 108 is detected in the frame.

Change assessment system 100 determines a probability of detection 126 of the target object 108 in the sequence of aerial images 120 according to their confidence scores. Change assessment system 100 determines a status of change 128 (i.e., change or no change) to the target object 108 in real-time according to the confidence score 124 of object detection in each of the sequence of aerial images 120.

Change assessment system 100 uses feature matching 130 to determine a percentage of change 132 in the target object 108 between the original aerial image 104 taken during the first flyover and the subsequent sequence of aerial images 120 taken during the subsequent flyover. Feature matching 130 may employ scale and rotation invariant key points matching so that the UAV 140 is not required to approach the target object 108 from same exact path and angle as used during the initial flyover in object detection mode 102.

Probability of change 134 is determined by combining the probability of detection 126 of the target object 108 and the percentage of change 132 from the feature matching 130 as two statistically independent events.

Change assessment system 100 may calculate a transition probability 136 of consecutive image frames based on the probability of change 134 from one frame to the next. A penalty score may be applied to the transition probability 136 in favor of the result of object detection.

Change assessment system 100 may use the transition probability 136 and the status of change 128 of the current and all previous frames of aerial images 120 to continually update the percentage of change 132 and probability of change 134 in real-time, thereby reducing any errors in both calculations.

Change assessment system 100 will continually output an updated probability of change 134 and percentage of change 132 of each aerial image 122 in the sequence of aerial images 120 to the computer system 150 during the flight until the UAV 140 exits the geographic boundary 112 of the target area 106, at which time the change assessment system 100 will output a final change assessment 138 according to the percentage of change 132 of the target object 108.

Change assessment system 100 can be implemented in software, hardware, firmware, or a combination thereof. When software is used, the operations performed by change assessment system 100 can be implemented in program code configured to run on hardware, such as a processor unit. When firmware is used, the operations performed by change assessment system 100 can be implemented in program code and data and stored in persistent memory to run on a processor unit. When hardware is employed, the hardware can include circuits that operate to perform the operations in change assessment system 100.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 150 is a physical hardware system and includes one or more data processing systems. When more than one data processing system is present in computer system 150, those data processing systems are in communication with each other using a communications medium. The communications medium can be a network. The data processing systems can be selected from at least one of a computer, a server computer, a tablet computer, or some other suitable data processing system.

As depicted, computer system 150 includes a number of processor units 152 that are capable of executing program code 154 implementing processes in the illustrative examples. As used herein a processor unit in the number of processor units 152 is a hardware device and is comprised of hardware circuits such as those on an integrated circuit that respond and process instructions and program code that operate a computer. When a number of processor units 152 execute program code 154 for a process, the number of processor units 152 is one or more processor units that can be on the same computer or on different computers. In other words, the process can be distributed between processor units on the same or different computers in a computer system. Further, the number of processor units 152 can be of the same type or different type of processor units. For example, a number of processor units can be selected from at least one of a single core processor, a dual-core processor, a multi-processor core, a general-purpose central processing unit (CPU), a graphics processing unit (GPU), a digital signal processor (DSP), or some other type of processor unit.

Figure 2:
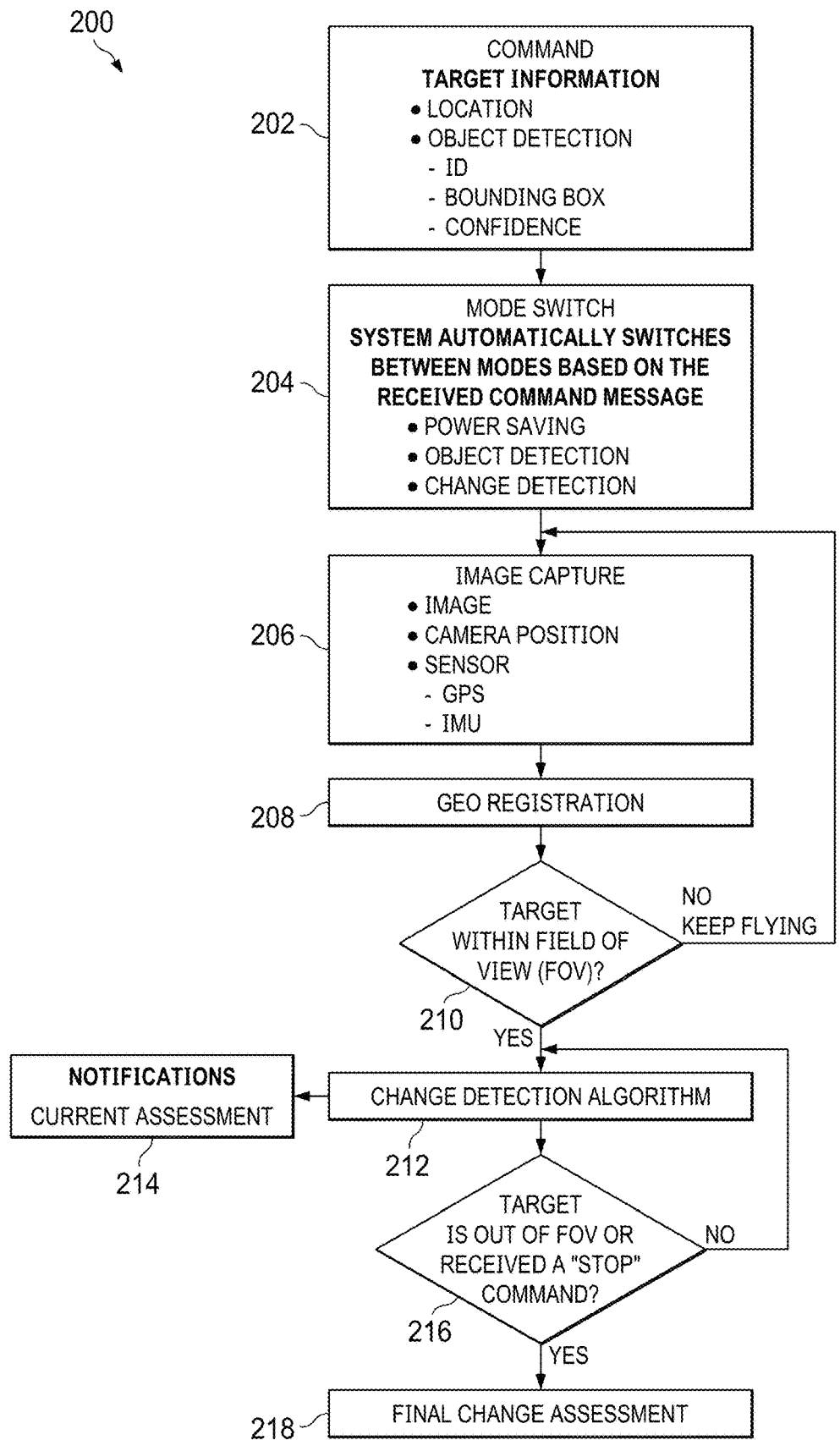
FIG. 2 depicts a block diagram illustrating the operation procedure of a change assessment system in accordance with an illustrative embodiment.

FIG. 2 depicts a block diagram illustrating the operation procedure of a change assessment system in accordance with an illustrative embodiment. Operation procedure 200 may be implemented in change assessment system 100 shown in FIG. 1.

Operation procedure 200 covers change detection mode 118 in FIG. 1 and assumes the location and a sample image of the target object from the initial flyover in object detection mode 102 is provided. Target information may be in the form of command 202 which includes location, identification, a bounding box, and confidence score.

The system automatically performs a mode switch 204 between modes (power saving, object detection, change detection) based on the received command message. In the present example the received command 202 switches the system to change detection mode.

During the change detection flyover, the system uses inputs from the flight camera, GPS, and IMU to estimate the geographical boundaries of the current image capture 206. Geographical registration 208 uses the geographical boundaries determined by the GPS location to ensure the image capture 206 encloses the target object, thereby obviating the need for orthorectification of the raw inputs.

The system determines 210 if target object is within flight camera field of view according to geographical registration 208. If the target object is not within the camera field of view, the system will continue to fly towards the target location and capture another image.

If the target object is within the camera field of view, the change detection algorithm 212 starts. Change detection algorithm 212 continues to provide notifications 214 to update the current change assessment from the camera feed until the target object exits the field of view of the camera.

Upon a determination 216 that the target is no longer in the field of view of the camera (i.e., the UAV has finished the flyover and left the target area) or in response to a stop command, the system produces a final change assessment 218. The system will automatically switch to "power saving" mode when the final change assessment is submitted.

Figure 3:
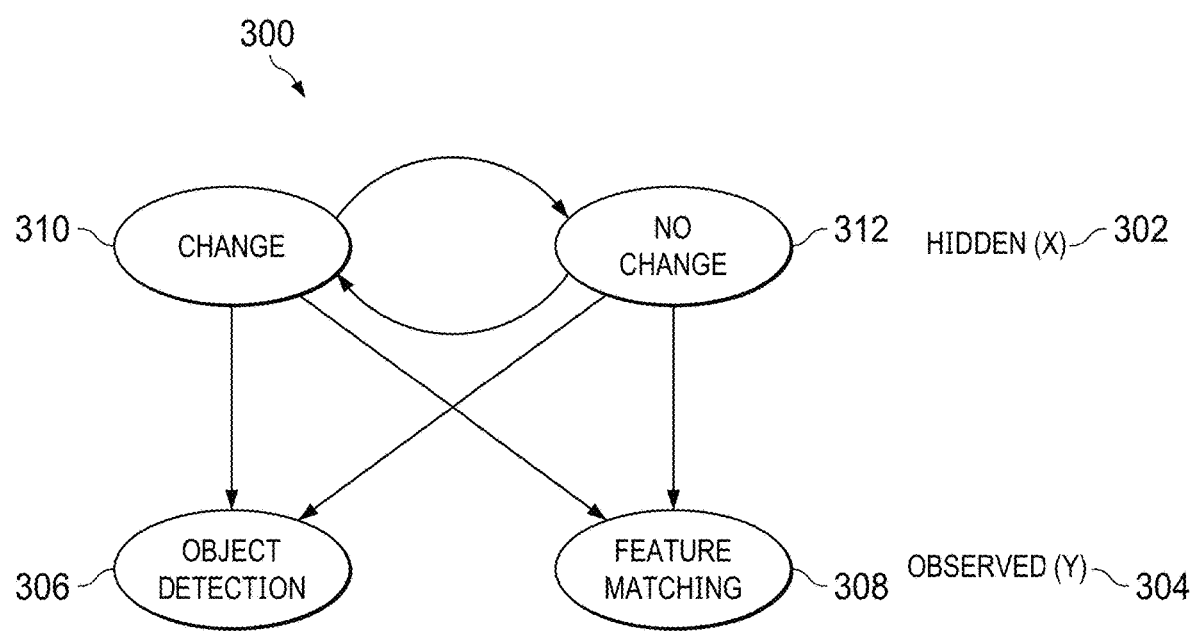
FIG. 3 depicts a diagram illustrating a change detection algorithm in accordance with an illustrative embodiment.

FIG. 3 depicts a diagram illustrating a change detection algorithm in accordance with an illustrative embodiment. Change detection algorithm 300 may be an example implementation of change detection algorithm 212 in FIG. 2.

The change detection algorithm 300 has three components: an object detection model, a feature matching model, and a probability propagation model. The change detection algorithm 300 is formulated as a hidden Markov chain wherein observed states 304 (i.e., object detection 306 and feature matching 308) contribute to the estimation of the hidden states 302 (i.e., "change" 310 or "no change" 312). The observations from object detection 306 and feature matching 308 are statistically independent.

Change detection algorithm 300 considers the object detection model a stronger observer than the feature matching model. The confidence score of the object detection model is utilized to determine the probability of change because the objection detection model is trained on all "normal" (i.e., undamaged, pre-change) states of the target object. A lower score indicates more change/damage to the target object.

A scale and rotation invariant feature matching may be performed after object detection to determine the percentage of change. The feature matching may comprise keypoint feature descriptors, e.g., binary robust invariant scalable keypoints (BRISK) or oriented FAST and Rotated BRIEF (ORB). The percentage of change may be normalized based on the change/no change state estimation of both observers. The stronger observer (object detection 306) has a higher weight on the normalization of the percentage. The system will output the assessment based on the percentage.

The system uses the propagation model to continually update the change estimation over time. Stack storage in memory and an in-flight database may be used to track the state updates and provide better estimation as more image captures become available over the course of a flyover. The final change assessment is the propagation of all observed states from when the target object first enters the flight camera field of view to exiting the field of view.

Figure 4A:
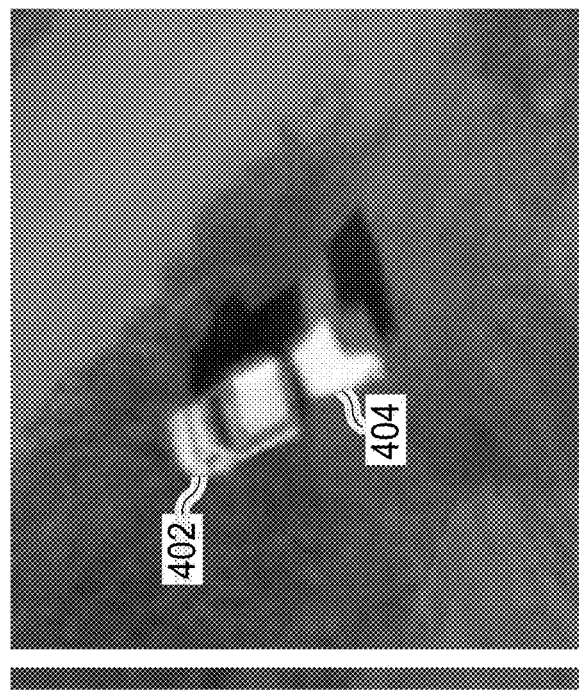
FIG. 4A depicts an image of a target object detected before change in accordance with an illustrative embodiment.
Figure 4B:
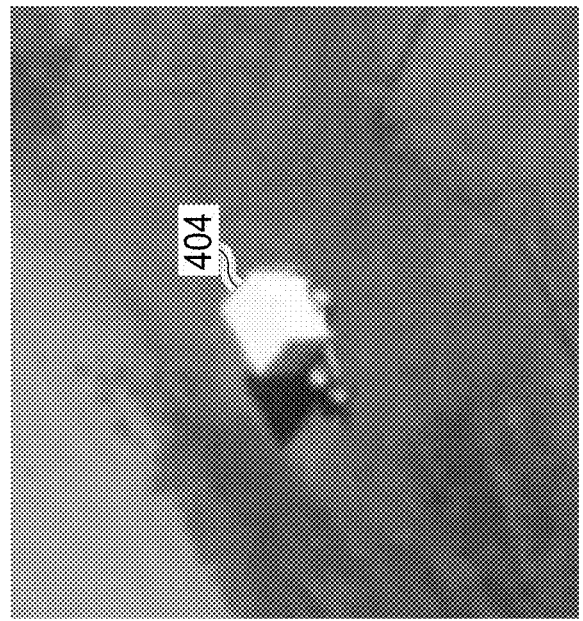
FIG. 4B depicts an image of a target object detected after change in accordance with an illustrative embodiment.

FIGS. 4A and 4B depict a sequence of images illustrating a target object detected before and after change, respectively, in accordance with an illustrative embodiment. In the present example, a truck 402 with an attached trailer 404 is detected in FIG. 4A. In FIG. 4B, the truck 402 is removed, leaving only the trailer 404.

Using only the images from the camera capture, the system can estimate a change percentage of the truck-trailer combination versus just the trailer to form a change assessment. The system can handle situations such as that shown in FIGS. 4A and 4B when the before and after images of the target object are captured from different viewing angles. There is no pre-aligned requirement.

Figure 5:
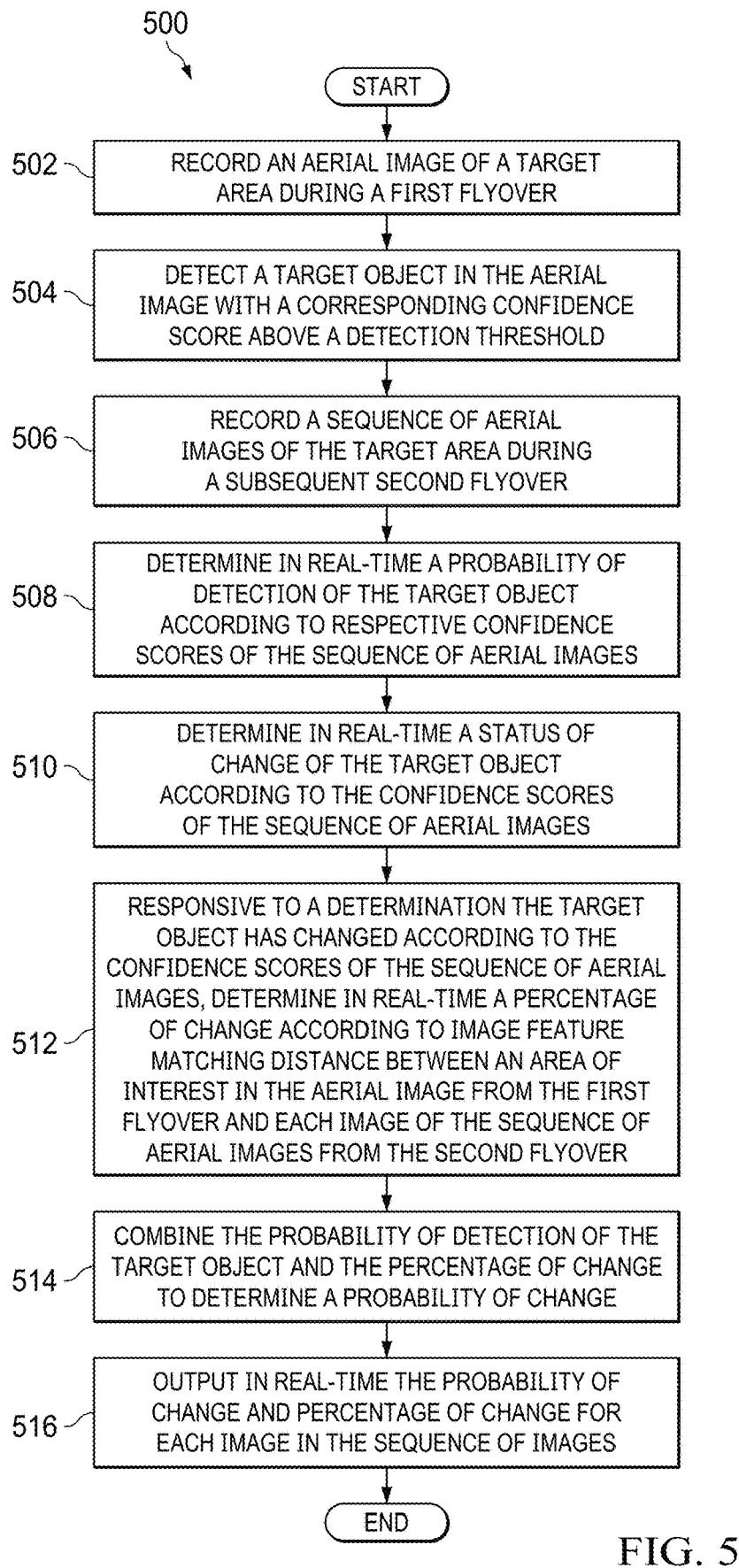
FIG. 5 depicts a flowchart illustrating a process for change assessment of target objects in accordance with an illustrative embodiment.

Turning next to FIG. 5, an illustration of a flowchart of a process for change assessment of target objects is depicted in accordance with an illustrative embodiment. The process in FIG. 5 can be implemented in hardware, software, or both. When implemented in software, the process can take the form of program code that is run by one of more processor units located in one or more hardware devices in one or more computer systems. For example, the process can be implemented in change assessment system 100 in computer system 150 in FIG. 1. The method is performed onboard an unmanned aerial vehicle.

Process 500 begins by recording an aerial image of a target area during a first flyover (operation 502)

Detecting a target object in the aerial image with a corresponding confidence score above a detection threshold (operation 504).

Recording a sequence of aerial images of the target area during a subsequent second flyover (operation 506).

Determining in real-time a probability of detection of the target object according to respective confidence scores of the sequence of aerial images (operation 508).

Determining in real-time a status of change of the target object according to the confidence scores of the sequence of aerial images (operation 510).

Responsive to a determination the target object has changed according to the confidence scores of the sequence of aerial images, determining in real-time a percentage of change according to image feature matching distance between an area of interest in the aerial image from the first flyover and each image of the sequence of aerial images from the second flyover (operation 512). The featuring matching comprises scale and rotation invariant key point matching. Determining the percentage change of the target object further comprises hidden Markov chain normalization of the percentage of change of the target object.

Combining the probability of detection of the target object and the percentage of change as statistically independent events to determine a probability of change (operation 514).

Outputting in real-time the probability of change and percentage of change for each image in the sequence of images (operation 516). Process 500 then ends.

Figure 6:
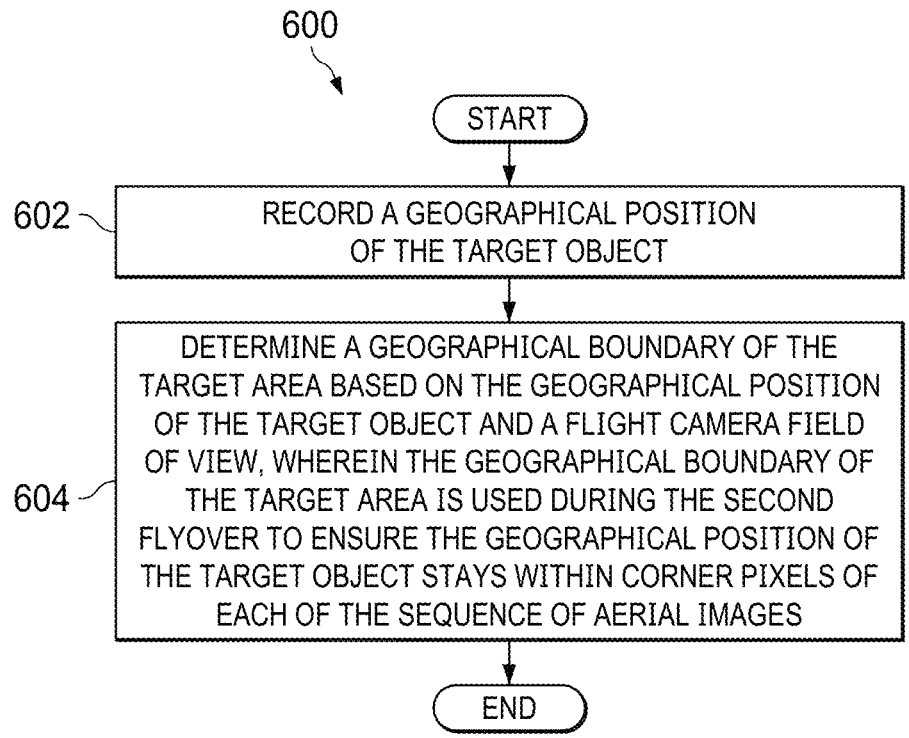
FIG. 6 depicts a flowchart illustrating a process for determining the geography boundary of a target area in accordance with an illustrative embodiment.

FIG. 6 depicts a flowchart illustrating a process for determining the geography boundary of a target area in accordance with an illustrative embodiment.

Recording a geographical position of the target object (operation 602).

Determining a geographical boundary of the target area based on the geographical position of the target object and a flight camera field of view, wherein the geographical boundary of the target area is used during the second flyover to ensure the geographical position of the target object stays within corner pixels of each of the sequence of aerial images (operation 604).

Figure 7:
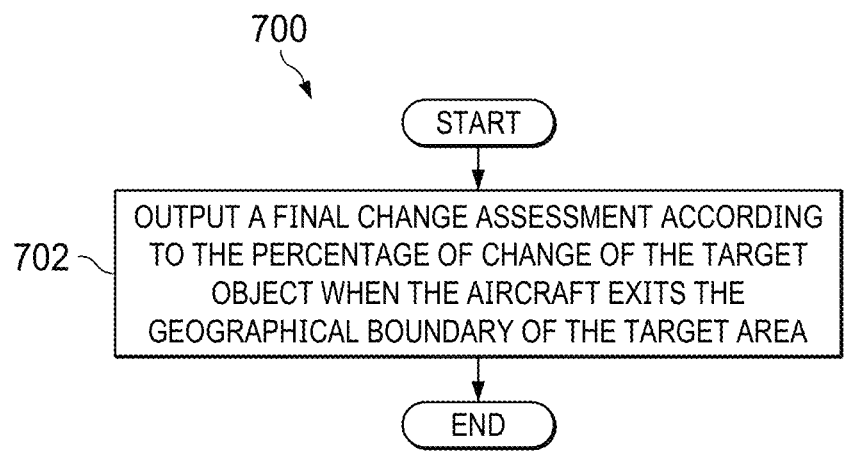
FIG. 7 depicts a flowchart illustrating a process for outputting a final change assessment in accordance with an illustrative embodiment.

FIG. 7 depicts a flowchart illustrating a process for outputting a final change assessment in accordance with an illustrative embodiment.

Outputting a final change assessment according to the percentage of change of the target object when the aircraft exits the geographical boundary of the target area (operation 702).

Figure 8:
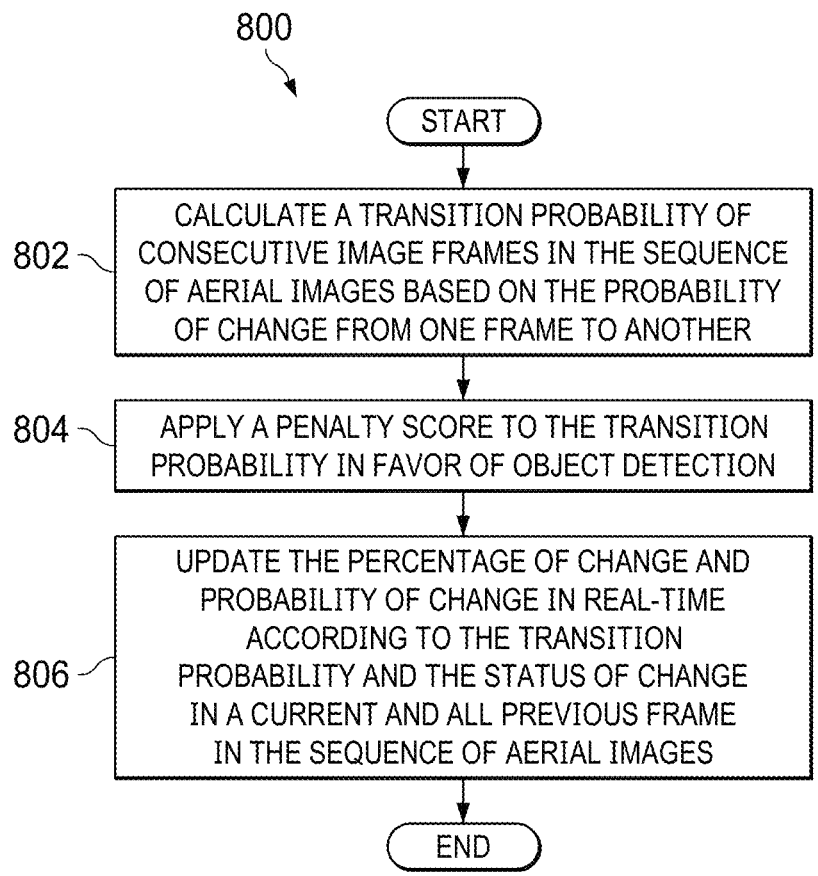
FIG. 8 depicts a flowchart illustrating a process for real-time updating of change assessment in accordance with an illustrative embodiment.

FIG. 8 depicts a flowchart illustrating a process for real-time updating of change assessment in accordance with an illustrative embodiment.

Calculating a transition probability of consecutive image frames in the sequence of aerial images based on the probability of change from one frame to another (operation 802).

Applying a penalty score to the transition probability in favor of object detection (operation 804).

Updating the percentage of change and probability of change in real-time according to the transition probability and the status of change in a current and all previous frame in the sequence of aerial images (operation 806).

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware can, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 9:
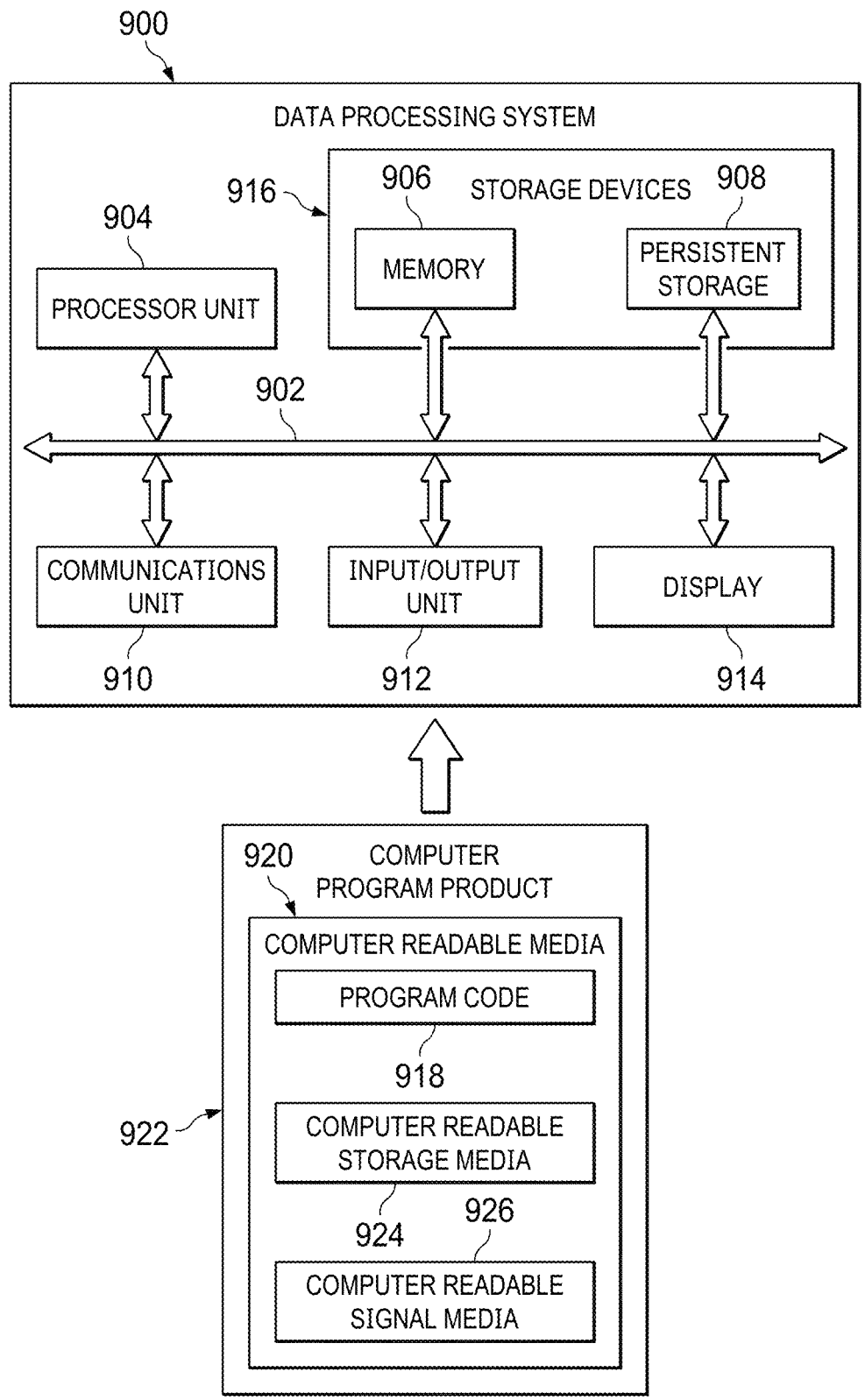
FIG. 9 is an illustration of a block diagram of a data processing system in accordance with an illustrative embodiment.

Turning now to FIG. 9, an illustration of a block diagram of a data processing system is depicted in accordance with an illustrative embodiment. Data processing system 900 may be used to implement computer system 150 in FIG. 1. In this illustrative example, data processing system 900 includes communications framework 902, which provides communications between processor unit 904, memory 906, persistent storage 908, communications unit 910, input/output (I/O) unit 912, and display 914. In this example, communications framework 902 takes the form of a bus system.

Processor unit 904 serves to execute instructions for software that may be loaded into memory 906. Processor unit 904 may be a number of processors, a multi-processor core, or some other type of processor, depending on the particular implementation. In an embodiment, processor unit 904 comprises one or more conventional general-purpose central processing units (CPUs). In an alternate embodiment, processor unit 904 comprises one or more graphical processing units (CPUs).

Memory 906 and persistent storage 908 are examples of storage devices 916. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 916 may also be referred to as computer-readable storage devices in these illustrative examples. Memory 906, in these examples, may be, for example, a random access memory or any other suitable volatile or non-volatile storage device. Persistent storage 908 may take various forms, depending on the particular implementation.

For example, persistent storage 908 may contain one or more components or devices. For example, persistent storage 908 may be a hard drive, a flash memory, a rewritable optical disk, a rewritable magnetic tape, or some combination of the above. The media used by persistent storage 908 also may be removable. For example, a removable hard drive may be used for persistent storage 908. Communications unit 910, in these illustrative examples, provides for communications with other data processing systems or devices. In these illustrative examples, communications unit 910 is a network interface card.

Input/output unit 912 allows for input and output of data with other devices that may be connected to data processing system 900. For example, input/output unit 912 may provide a connection for user input through at least one of a keyboard, a mouse, or some other suitable input device. Further, input/output unit 912 may send output to a printer. Display 914 provides a mechanism to display information to a user.

Instructions for at least one of the operating system, applications, or programs may be located in storage devices 916, which are in communication with processor unit 904 through communications framework 902. The processes of the different embodiments may be performed by processor unit 904 using computer-implemented instructions, which may be located in a memory, such as memory 906.

These instructions are referred to as program code, computer-usable program code, or computer-readable program code that may be read and executed by a processor in processor unit 904. The program code in the different embodiments may be embodied on different physical or computer-readable storage media, such as memory 906 or persistent storage 908.

Program code 918 is located in a functional form on computer-readable media 920 that is selectively removable and may be loaded onto or transferred to data processing system 900 for execution by processor unit 904. Program code 918 and computer-readable media 920 form computer program product 922 in these illustrative examples. In one example, computer-readable media 920 may be computer-readable storage media 924 or computer-readable signal media 926.

In these illustrative examples, computer-readable storage media 924 is a physical or tangible storage device used to store program code 918 rather than a medium that propagates or transmits program code 918. Computer readable storage media 924, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 918 may be transferred to data processing system 900 using computer-readable signal media 926. Computer-readable signal media 926 may be, for example, a propagated data signal containing program code 918. For example, computer-readable signal media 926 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 900 are not meant to provide architectural limitations to the manner in which different embodiments may be implemented. The different illustrative embodiments may be implemented in a data processing system including components in addition to or in place of those illustrated for data processing system 900. Other components shown in FIG. 9 can be varied from the illustrative examples shown. The different embodiments may be implemented using any hardware device or system capable of running program code 918.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method for automated change assessment of target objects, the method comprising using a number of processors to perform operations of:
    recording an aerial image of a target area during a first flyover;
    detecting a target object in the aerial image with a corresponding confidence score above a detection threshold;
    recording a sequence of aerial images of the target area during a subsequent second flyover;
    calculating a transition probability of consecutive image frames in the sequence of aerial images based on a probability of change from one frame to another;
    applying a penalty score to the transition probability in favor of object detection;
    updating a percentage of change and the probability of change in real-time according to the transition probability and a status of change in the current and all previous frames in the sequence of aerial images;
    determining in real-time a probability of detection of the target object according to respective confidence scores of the sequence of aerial images;
    determining in real-time a status of change of the target object according to the confidence scores of the sequence of aerial images;
    responsive to a determination that the target object has changed, determining by feature matching in real-time a percentage of change in a distance between an area of interest in the aerial image from the first flyover and each image of the sequence of aerial images from the second flyover;
    combining the probability of detection of the target object and the percentage of change as statistically independent events to determine a probability of change; and
    outputting in real-time the probability of change and percentage of change for each image in the sequence of images.

2. The method of claim 1, further comprising recording a geographical position of the target object.

3. The method of claim 2, further comprising outputting a final change assessment according to the percentage of change of the target object when a flight camera field of view exits a geographical boundary of the target area.

4. The method of claim 1, wherein determining the percentage change of the target object further comprises hidden Markov chain normalization of the percentage of change of the target object.

5. The method of claim 1, wherein the method is performed onboard an unmanned aerial vehicle.

6. The method of claim 1, further comprising determining a geographical boundary of the target area based on a geographical position of the target object and a flight camera field of view, wherein the geographical boundary of the target area is used during the second flyover to ensure the geographical position of the target object stays within corner pixels of each of the sequence of aerial images.

7. The method of claim 1, wherein the feature matching comprises scale and rotation invariant key point matching.

8. A computer-implemented method for real-time automated change assessment by a flight computer onboard an unmanned aerial vehicle, the method comprising performing, using a number of processors onboard the unmanned aerial vehicle, operations of:
    recording, with an onboard flight camera, an aerial image of a target area during a first flyover;
    detecting a target object in the aerial image with a corresponding confidence score above a detection threshold;
    recording, with the onboard flight camera, a sequence of aerial images of the target area during a subsequent second flyover;
    calculating a transition probability of consecutive image frames in the sequence of aerial images based on a probability of change from one frame to another;
    applying a penalty score to the transition probability in favor of object detection;
    updating a percentage of change and probability of change in real-time according to the transition probability and a status of change in the current and all previous frames in the sequence of aerial images;
    determining in real-time a probability of detection of the target object according to respective confidence scores of the sequence of aerial images;
    determining in real-time a status of change of the target object according to the confidence scores of the sequence of aerial images;
    responsive to a determination that the target object has changed, determining by image feature matching in real-time a percentage of change in a distance between an area of interest in the aerial image from the first flyover and each image of the sequence of aerial images from the second flyover;

combining the probability of detection of the target object and the percentage of change as statistically independent events to determine a probability of change; and outputting in real-time the probability of change and percentage of change for each image in the sequence of images.

9. The method of claim 8, further comprising recording a geographical position of the target object.

10. The method of claim 9, further comprising outputting a final change assessment according to the percentage of change of the target object when the unmanned aerial vehicle exits a geographical boundary of the target area.

11. The method of claim 8, wherein determining the percentage change of the target object further comprises hidden Markov chain normalization of the percentage of change of the target object.

12. The method of claim 8, further comprising determining a geographical boundary of the target area based on a geographical position of the target object and a field of view of the onboard flight camera, wherein the geographical boundary of the target area is used during the second flyover to ensure the geographical position of the target object stays within corner pixels of each of the sequence of aerial images.

13. A system configured to assess change of target objects, wherein the system comprises:

a storage device configured to store program instructions; and one or more processors operably connected to the storage device and configured to execute the program instructions to cause the system to:

record an aerial image of a target area during a first flyover;

detect a target object in the aerial image with a corresponding confidence score above a detection threshold;

record a sequence of aerial images of the target area during a subsequent second flyover;

calculate a transition probability of consecutive image frames in the sequence of aerial images based on a probability of change from one frame to another;

apply a penalty score to the transition probability in favor of object detection;

update a percentage of change and probability of change in real-time according to the transition probability and a status of change in the current and all previous frames in the sequence of aerial images;

determine in real-time a probability of detection of the target object according to respective confidence scores of the sequence of aerial images;

determine in real-time a status of change of the target object according to the confidence scores of the sequence of aerial images;

responsive to a determination that the target object has changed, determine based upon image feature matching in real-time a percentage of change in a distance between an area of interest in the aerial image from the first flyover and each image of the sequence of aerial images from the second flyover;

combine the probability of detection of the target object and the percentage of change as statistically independent events to determine a probability of change; and output in real-time the probability of change and percentage of change for each image in the sequence of images.

14. The system of claim 13, wherein the processors further execute instructions to record a geographical position of the target object.

15. The system of claim 14, wherein the processors further execute instructions to output a final change assessment according to the percentage of change of the target object when a flight camera field of view exits a geographical boundary of the target area.

16. The system of claim 13, wherein determining the percentage change of the target object further comprises hidden Markov chain normalization of the percentage of change of the target object.

17. The system of claim 13, wherein the system is on board an unmanned aerial vehicle.

18. The system of claim 13, wherein the processors further execute instructions to determine a geographical boundary of the target area based on a geographical position of the target object and a flight camera field of view, wherein the geographical boundary of the target area is used during the second flyover to ensure the geographical position of the target object stays within corner pixels of each of the sequence of aerial images.

19. The system of claim 13, wherein the image feature matching comprises scale and rotation invariant key point matching.

20. A computer program product configured to assess change target objects, wherein the computer program product comprises a non-transitory computer-readable storage medium comprises program instructions embodied thereon configured to perform the steps of:

recording an aerial image of a target area during a first flyover;

detecting a target object in the aerial image with a corresponding confidence score above a detection threshold;

recording a sequence of aerial images of the target area during a subsequent second flyover;

calculating a transition probability of consecutive image frames in the sequence of aerial images based on a probability of change from one frame to another;

applying a penalty score to the transition probability in favor of object detection;

updating a percentage of change and probability of change in real-time according to the transition probability and a status of change in the current and all previous frames in the sequence of aerial images;

determining in real-time a probability of detection of the target object according to respective confidence scores of the sequence of aerial images;

determining in real-time a status of change of the target object according to the confidence scores of the sequence of aerial images;

responsive to a determination that the target object has changed, determining by image feature matching in real-time a percentage of change in a distance between an area of interest in the aerial image from the first flyover and each image of the sequence of aerial images from the second flyover;

combining the probability of detection of the target object and the percentage of change as statistically independent events to determine a probability of change;

outputting in real-time the probability of change and percentage of change for each image in the sequence of images; and outputting a final change assessment upon leaving geographical boundaries of the target area.

* * * * *